(12) United States Patent
Götzenberger

(10) Patent No.: US 7,492,142 B2
(45) Date of Patent: Feb. 17, 2009

(54) DC CHOPPER AND METHOD FOR OPERATING A DC CHOPPER

(75) Inventor: Martin Götzenberger, Ingolstadt (DE)

(73) Assignee: Siemens Aktiengesellschaft, Munich (DE)

(*) Notice: Subject to any disclaimer, the term of this patent is extended or adjusted under 35 U.S.C. 154(b) by 177 days.

(21) Appl. No.: 11/584,268

(22) Filed: Oct. 20, 2006

(65) Prior Publication Data

US 2007/0090813 A1    Apr. 26, 2007

(30) Foreign Application Priority Data

Oct. 20, 2005    (DE) .................. 10 2005 050 337

(51) Int. Cl.
*G06F 5/00*    (2006.01)
(52) U.S. Cl. .................. 323/299; 323/222; 323/272; 323/351; 363/124
(58) Field of Classification Search .......... 323/222, 323/272, 299, 351; 363/124
See application file for complete search history.

(56) References Cited

U.S. PATENT DOCUMENTS

| | | | | |
|---|---|---|---|---|
| 4,652,808 A | * | 3/1987 | Mostyn et al. | ............... 323/222 |
| 6,023,158 A | * | 2/2000 | Liu | ............... 323/351 |
| 6,664,770 B1 | * | 12/2003 | Bartels | ............... 323/222 |
| 7,180,275 B2 | * | 2/2007 | Reithmaier | ............... 323/222 |
| 7,279,878 B2 | * | 10/2007 | Ootani et al. | ............... 323/285 |
| 7,397,678 B2 | * | 7/2008 | Frank et al. | ............... 363/89 |
| 7,425,819 B2 | * | 9/2008 | Isobe | ............... 323/222 |

* cited by examiner

*Primary Examiner*—Jeffrey L Sterrett
(74) *Attorney, Agent, or Firm*—Laurence A. Greenberg; Werner H. Stemer; Ralph E. Locher

(57) ABSTRACT

A DC chopper features a setting device, which sets a required current value signal being dependent on a filtered input voltage such that an oscillation of the input filter device and an oscillation of the current are phase-opposed. The DC chopper may further have a control device, which, depending on the input voltage, supplies a control signal and adds the control signal to the actual current value signal supplied to form a controlled actual current value signal. The DC chopper may optionally have a disconnection device, which receives a switch-off signal on the input side and, depending on the switch-off signal received, supplies a ramp disconnection signal, and an adding node which adds the actual current value signal to the ramp disconnection signal to form an elevated actual current value signal.

18 Claims, 3 Drawing Sheets

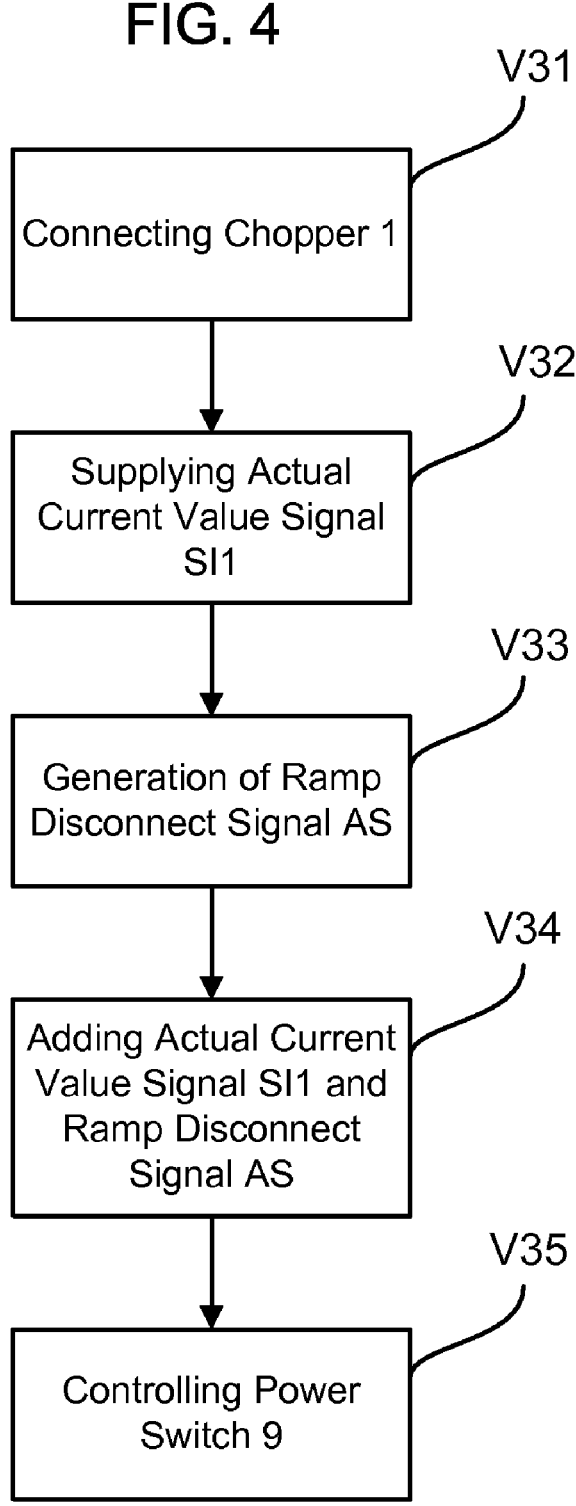

DC CHOPPER AND METHOD FOR OPERATING A DC CHOPPER

CROSS-REFERENCE TO RELATED APPLICATION

This application claims the priority, under 35 U.S.C. §119, of German application DE 10 2005 050 337.3, filed Oct. 20, 2005; the prior application is herewith incorporated by reference in its entirety.

BACKGROUND OF THE INVENTION

Field of the Invention

The invention relates to a DC chopper, which converts an input voltage of an input capacitor into an output voltage of an output capacitor.

In modern internal combustion engines with fuel injection the need arises to supply the injection valves with a short current impulse at a high current intensity. The output capacitor acts as an energy accumulator, for example for the injection valve of the internal combustion engine.

In the supply of energy to an injection valve by the output capacitor of the DC chopper, electromagnetic compatibility (EMC) represents an important criterion in the construction of the DC chopper.

There are many topologies and methods of operation known for the implementation of the DC chopper or DC/DC converter. Depending on the power and EMC behavior requirements of the DC chopper to be provided, multiphase converters are also used. However single-phase converters or DC choppers have the advantage of being able to be operated at the boundary of the intermittent direct current. The intermittent DC boundary in this case designates the boundary between an intermittent and non-intermittent operation. Operation at the intermittent DC boundary is marked by a particularly good EMC behavior, especially in the high-frequency operating range, in which measures for reduction of faults that have a negative effect on the electromagnetic compatibility can only be implemented at great expense.

Operation at the intermittent DC boundary means however that there is a fixed relationship between the operating frequency, the input voltage, the output voltage and the required current value of the DC chopper. This fixed relationship initially conflicts with the use of a multiphase DC chopper, which is used to increase power while simultaneously reducing low-frequency ripple currents. If for example one stage of the multiphase DC chopper is drawing current, the operation of the multiphase DC chopper at the intermittent DC boundary is conventionally no longer possible because of the dependence of the relevant frequencies or operating frequencies of the stages of the DC chopper on the respective current drawn.

These changes to the respective frequencies, especially through the drawing of current by one or more phases of the multiphase DC chopper also has negative effects on the input filter device connected upstream of the multiphase DC chopper which filters the input voltage received and to be filtered. Since increased EMC requirements for the input filter mean that only higher-order filters can be considered, an increased tendency to oscillate must also be taken into account since the tendency to oscillate is dependent on the filter quality of the input filter device. The input filter device is conventionally passively damped, for example through series resistors for capacitors or through parallel resistors for inductors.

A further problem arises especially when a multiphase DC chopper is not to be operated with a fixed input voltage value but over a range of input voltages. Since the DC chopper is current-regulated, the output power of the DC chopper continues to increase as the input voltage increases. Especially for the range that is relevant for the EMC behavior, the currents exhibit far higher current values than required, so that the load imposed on the components is far higher than necessary.

Furthermore, because of the oscillation capability of the input filter, especially with a hard switch-off, the problem of additional oscillation arises, which also has the negative effects mentioned above, especially increased energy losses.

SUMMARY OF THE INVENTION

It is accordingly an object of the invention to provide a DC chopper and a method for operating the DC chopper which overcome the above-mentioned disadvantages of the prior art devices and methods of this general type, in which oscillations at the input filter can be damped with simple and/or low-cost circuit technology measures. A further object is to operate a DC chopper, especially at higher input voltages, such that the maximum value of the current of the DC chopper is reduced. Another object of the invention is to minimize oscillations when the DC chopper is switched off.

With the foregoing and other objects in view there is provided, in accordance with the invention, a DC chopper for converting an input voltage into an output voltage. The DC chopper includes two input terminals for receiving the input voltage, an output capacitor providing the output voltage and the DC chopper supplying a current for charging the output capacitor, an input capacitor, and an input filter device coupled between the input terminals and the input capacitor. The input filter device filters the input voltage resulting in a filtered input voltage being supplied to the input capacitor. A setting device sets a required current value signal which is dependent on the filtered input voltage, such that an oscillation of the input filter device and an oscillation of the current are phase-opposed. A controllable power switch is coupled to the input capacitor. A controller is connected to and switches the controllable power switch for controlling a current discharge from the input capacitor in dependence on the required current value signal.

Advantageously any oscillation present is actively damped by the phase-opposed modulation of the oscillation of the input filter device and the oscillation of the current of the DC chopper. This is possible with the present DC chopper since the instantaneous current consumption is not of relevance. The output capacitor only has to be fully charged again after a predetermined time. Advantageously, although the instantaneous power is influenced by the modulation, its mean value is not. The inventive active damping of the oscillation operates without losses and furthermore reduces the losses in the filter components. A further advantage is that very few additional components are used in accordance with the invention and thereby minimal extra effort is involved in producing the circuit.

With the present invention, the filtered input voltage is coupled to the actual current value through a resistor (for each phase with a multiphase DC chopper), which causes the peak current switching point to migrate to lower current values as the input voltage increases. The forward compensation of the input voltage reduces the power dissipation of the (multiphase) DC chopper in the normal operating range and ensures lower currents, especially in the relevant operating voltage range, which is equivalent to improved EMC behavior.

The ramp-shaped and thereby soft switch-off of the DC chopper reduces filter oscillations on switch-off which could conventionally only be damped by losses in the respective components.

In accordance with a preferred further development of the invention, the first control device switches off the controllable power switch if an actual current value signal of the current is greater than the required current value signal.

In accordance with a further preferred development, the DC chopper is embodied as a multiphase DC chopper, featuring a plurality of N DC choppers connected in parallel between the input capacitor and the output capacitor, whereby an nth DC chopper supplies a nth current to charge the output capacitor, with $n \in [1, \ldots, N]$.

In accordance with a further preferred development of the invention, the nth DC chopper features a peak current detection device that supplies a peak current detection signal if the actual current value signal of the nth DC chopper is greater than the required current value signal that is specified for the nth DC chopper.

In accordance with a further preferred development, a regulation device is provided which features at least one RS flip-flop, which, at least for the nth DC chopper, supplies an nth phase difference signal from a phase difference signal between the nth peak current detection signal and the (n+1)th peak current detection signal on the output side.

In accordance with a further preferred embodiment of the invention the regulation device features at least one RC element, which at its output node supplies a first nth required current value part signal, depending on the nth phase difference signal supplied.

In accordance with a further preferred embodiment the setting device is embodied as a series circuit of a setting resistor and a capacitor disposed between an output node of the input filter device and the input node of the first RC element, whereby the setting device supplies a second nth required current value part signal depending on the filtered input voltage on the output side.

In accordance with a further preferred embodiment the output node of the first RC element adds the first nth required current value part signal and the second nth required current part signal to form the nth required current value signal.

In accordance with a further preferred embodiment the peak current detection device is provided integrated into the first controller.

In accordance with a further preferred embodiment the second controller includes: a second RC element, which filters the input voltage and supplies a filtered input voltage on the output side; a second resistor, which supplies the control signal on the output side depending on the filtered input voltage; and an output node, which adds the actual current value signal to the control signal to form the controlled actual current value signal.

In accordance with a further preferred development a third RC element, which filters the actual current value signal, is disposed between the first resistor and the output node of the second controller.

In accordance with a further preferred embodiment the disconnection device includes: a fourth RC element, which receives the switch-off signal on the input side and supplies a ramp switch-off signal depending on the received switch-off signal; and an amplifier device which amplifies the ramp switch-off signal for forming the ramp disconnection signal.

In accordance with a further preferred embodiment the amplification device features a transistor, which is connected as an emitter-follower, and a third resistor, which supplies the ramp disconnection signal as disconnection current.

Other features which are considered as characteristic for the invention are set forth in the appended claims.

Although the invention is illustrated and described herein as embodied in a DC chopper and a method for operating a DC chopper, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4 is a schematic flowchart of a third exemplary embodiment of the method in accordance with the invention.

DESCRIPTION OF THE PREFERRED EMBODIMENTS

Figure 1:
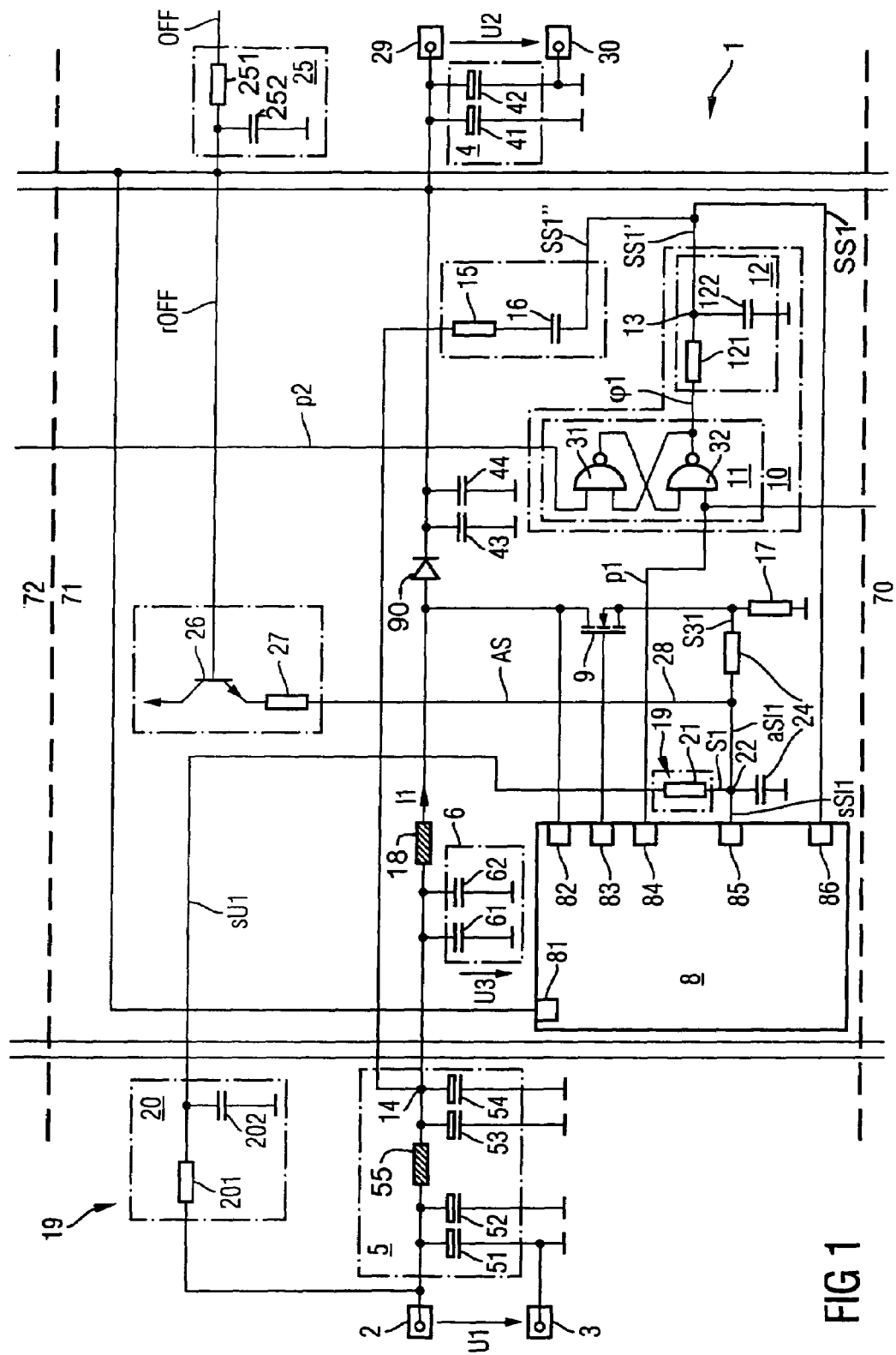
FIG. 1 is a schematic block diagram of a preferred exemplary embodiment of a DC chopper according to the invention.

In all figures identical elements or elements and signals with the same functions have—unless otherwise indicated—been labeled with the same reference symbols. Components, such as resistors or capacitors, are referenced below by their reference symbols. Referring now to the figures of the drawing in detail and first, particularly, to FIG. 1 thereof, there is shown a schematic block diagram of an exemplary embodiment of an inventive DC chopper 1. FIG. 1 shows a multiphase DC chopper. The present invention can also be applied without any restriction to a single-phase DC chopper. Without restricting general applicability the multi-phase DC chopper is embodied as a three-stage DC chopper (N=3) in accordance with the first exemplary embodiment. The exemplary embodiment in accordance with FIG. 1 shows the three-stage DC chopper 1, which features a first DC chopper 71 as its first phase, a second DC chopper 72 as its second phase and a third DC chopper 70 as its third phase. The DC choppers 70-72 are connected in parallel between an input capacitor 6 and an output capacitor 4.

The multiphase DC chopper 1 converts an input voltage U1 into an output voltage U2. The input voltage U1 is present between the input terminals 2, 3. An output voltage U2 is present between output terminals 29, 30. An output capacitor 4 acts as an energy accumulator. A non-illustrated load is supplied with energy by the stored output voltage U2. The load is for example embodied as an injection valve of an internal combustion engine of an automobile.

The input capacitor 6 is preferably embodied as a parallel circuit of the ceramic capacitors 61 and 62. The output capacitor 4 is for example embodied as a parallel circuit of the capacitors 41-44, whereby the capacitors 41 and 42 are each embodied as an electrolytic capacitor and the capacitors 43 and 44 as a ceramic capacitor.

Preferably the multiphase DC chopper 1 features an input filter device 5. The input filter device 5 is coupled between the input terminals 2, 3 and the input capacitor 6, especially connected in parallel to the input capacitor 6. The input filter device 5 filters the input voltage U1 so that a filtered input voltage U3 is supplied at the input capacitor 6. For example the input filter device 5 features the electrolytic capacitors 51-54 and an inductive actuator 55.

In particular each of the N DC choppers 70-72, for example the first DC chopper, features a setting device 15, 16 which sets a required current value signal SS1 as a function of the filtered input voltage U3, such that an oscillation of the input filter device 5 and an oscillation of the first current I1 are phase-opposed.

In addition a first controller 8 is provided which switches off a controllable power switch 9 for control of a current withdrawal or discharge from the input capacitor 6 in each case if an actual current value signal SI1 of the first current I1 is greater than the required current value signal SS1.

Preferably each of the N DC choppers 70-72 features a peak current detection device that supplies a peak current detection signal p1, p2 if the respective actual current value signal SI1 of the nth DC chopper 70-72 is greater than the required current value signal SS1 specified for the nth DC chopper 70-72. For example the peak current detection device of the first DC chopper 71 supplies the peak current detection signal p1 if the actual current value signal SI1 of the first DC chopper 71 is greater than the required current value signal SS1 predetermined for the first DC chopper 71.

In addition a regulation device 10 is provided. Preferably the regulation device 10 features an RS flip-flop 11 for each phase 70-72. The RS flip-flop 11 of the first DC chopper 71 supplies for example a first phase difference signal φ1 from a phase difference between the first peak current detection signal p1 and the second peak current detection signal p2 of the second DC chopper 72 on an output side.

Furthermore the regulation device 10 features at least one first RC element 12. The first RC element 12 supplies a first required current value part signal SS1' at its output node 13, depending on the phase difference signal φ1 supplied.

Preferably the setting device 15, 16 is embodied as a series circuit of a setting resistor 15 and a capacitor 16 disposed between an output node 14 of the input filter device 5 and the output node 13 of the first RC element 12. A second required current value part signal SS1", depending on the filtered input voltage U3 is supplied by the resistor 15. The capacitor 16 is used for decoupling a DC path between nodes 13 and 14.

In particular the first required current value part signal SS1' and the second required current value part signal SS1" are added to form the required current value signal SS1 at the output 13 of the first RC element 12.

Preferably the peak current detection device is provided integrated into the controller 8.

In addition a first resistor 17 is provided which, depending on the first current I1, supplies the actual current value signal SI1, which is supplied on an output side by the inductive control element 18 of the first DC chopper 71.

Furthermore a second controller 19 is provided which supplies a control signal S1, depending on the input voltage U1. In addition the second controller 19 adds the control signal S1 to the actual current value signal SI1 supplied in order to form a controlled actual current value signal sSI1. In such a case the first controller 8 switches the controllable power switch 9 off in each case if the controlled actual current value signal sSI1 is greater than the required current value signal SS1.

Preferably the second controller 19 features a second RC element 20, a second resistor 21 and an output node 22. The second RC element 20 filters the input voltage U1 and supplies a filtered output voltage sU1 on the output side. The second resistor 21 supplies the control signal S1 on the output side depending on the filtered input voltage sU1. The actual current value signal SI1 is added to the control signal S1 to form the controlled actual current value signal sSI1 at the output node 22. Preferably the second RC element 20 is formed of a resistor 201 and a capacitor 202.

In particular a third RC element 24 is provided between the first resistor 17 and the output node 22 of the second controller 19 for filtering the actual current value signal SI1.

In addition a disconnection device 25, 26, 27 is provided, which receives a switch-off signal OFF on an input side, which can assume binary values. The disconnection device 25, 26, 27 features a fourth RC element 25, which on the input side receives the switch-off signal OFF, and depending on the received switch-off signal OFF, supplies a ramp switch-off signal rOFF. The fourth RC element 25 features a resistor 251 and a capacitor 252.

Furthermore the disconnection device features an amplification device 26, 27 which amplifies the ramp switch-off signal rOFF to form a ramp disconnection signal AS. In this case the amplifier device 26, 27 is preferably embodied with a transistor 26, which is connected as an emitter-follower, and by a third resistor 27 which supplies the ramp disconnection signal AS as a disconnection current. In such a case the first controller 8 switches the controllable power switch 9 off in each case if the elevated actual current value signal aSI1 is greater than the required current value signal SS1.

For receiving and transmitting the corresponding signals the first controller features the ports 81-86. In this case port 81 is used for receiving the ramp switch-off signal rOFF. Port 82 is used as an input port for a ring-back detection device, which is also integrated in the first controller 8. The ring-back detection device measures a switch voltage of the controllable power switch 9 on freewheeling of the first current I1 via a free wheeling diode 90. Port 83 is used for controlling the power switch 9 via the first controller 8. The actual current value signal SI1 is received and further processed by the port 85. The required current value signal SS1 is received and further processed at port 86.

Figure 2:
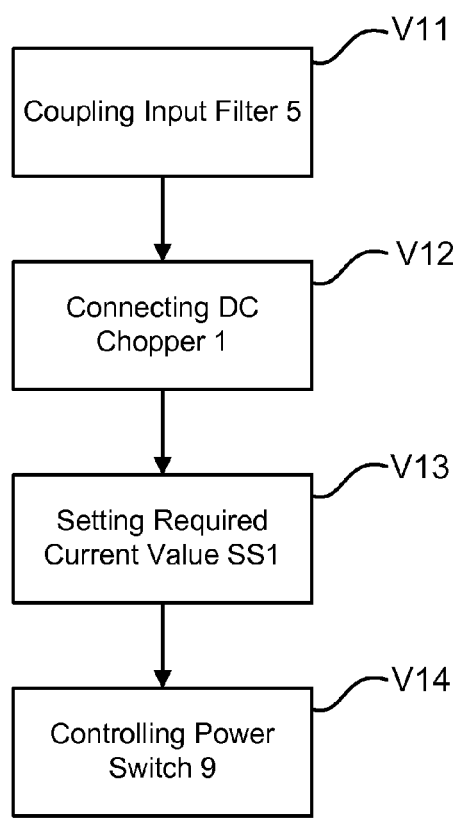
FIG. 2 is a schematic flowchart of a first exemplary embodiment of a method in accordance with the invention.

FIG. 2 shows a schematic flowchart of a first exemplary embodiment of a method in accordance with the invention for operating the DC chopper 1, which converts the input voltage U1 present between two input terminals 2, 3 into the output voltage U2 of the output capacitor 4.

The inventive method will be explained below with reference to the block diagram shown in FIG. 2. The inventive method features the now described steps.

Method Step V11:

Coupling the input filter device 5 between the input terminals 2, 3 and the input capacitor 6, which filters the input voltage U1, so that a filtered input voltage U3 is supplied at the input capacitor 6.

Method Step V12:

Provision of the DC chopper 1 connected in parallel between the input capacitor 6 and the output capacitor 4, which supplies a current I1 for charging the output capacitor 4.

Method Step V13:

Setting a required current value signal SS1 depending on the filtered input voltage U3 such that an oscillation of the input filter device 5 and an oscillation of the current I1 are phase-opposed.

Method Step V14:

Controlling the controllable power switch 9 for control of a current discharge from the input capacitor 6 is dependent on the required current value signal SS1. Preferably the power switch 9 is switched off in each case if the actual current value signal SI1 of the current I1 is greater than the required current value signal SS1.

Figure 3:
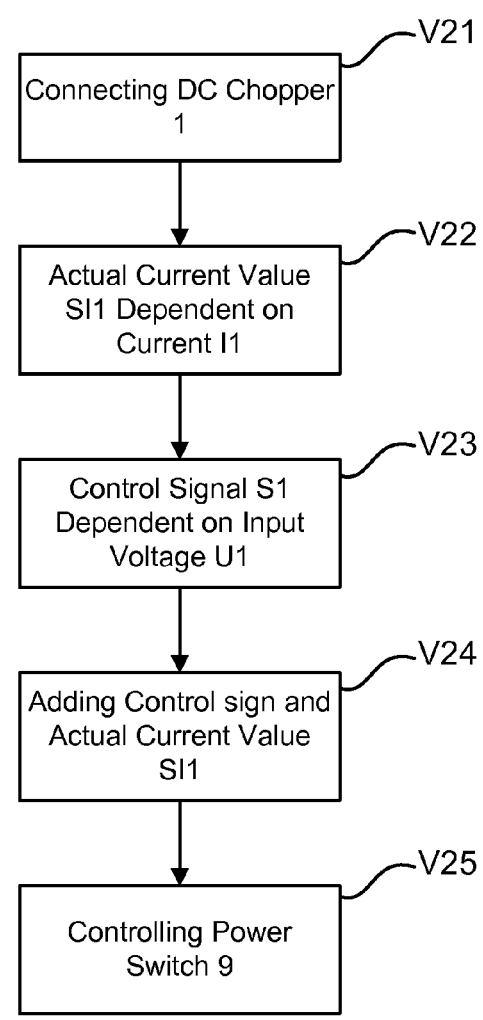
FIG. 3 is a schematic flowchart of a second exemplary embodiment of the method in accordance with the invention.

FIG. 3 shows a schematic flowchart of a second exemplary embodiment of the inventive method for operating the DC chopper 1, which converts the input voltage U1 of the input capacitor 6 into the output voltage U2 of the output capacitor 4.

The inventive method will be explained below with reference to the block diagram shown in FIG. 3. The inventive method features the now described steps.

Method Step V21:

Provision of the DC chopper 1 connected in parallel between the input capacitor 6 and the output capacitor 4, which supplies the current I1 for charging the output capacitor 4.

Method Step V22:

Provision of an actual current value signal SI1 being dependent on the current I1 which is supplied on the output side by an inductive actuator 18 of the DC chopper 71.

Method Step V23:

Provision of the control signal S1 being dependent on the input voltage U1.

Method Step V24:

Adding of the control signal S1 to the actual current value signal SI1 supplied to form a controlled actual current value signal sSI1.

Method Step V25:

Controlling the controllable power switch 9 for control of a current discharge from the input capacitor 6 such that the power switch 9 will be switched off in each case if the controlled actual current value signal sSI1 is greater than a required current value signal SS1 predetermined for the DC chopper 71.

FIG. 4 shows a schematic flowchart of a third exemplary embodiment of the inventive method for operating the DC chopper 1 which converts the input voltage U1 of the input capacitor 6 into the output voltage U2 of the output capacitor 4. The inventive method shown in FIG. 4 features the now described steps.

Method Step V31:

Provision of the DC chopper 1 connected in parallel between the input capacitor 6 and the output capacitor 4, which supplies the current I1 for charging the output capacitor 4.

Method Step V32:

Supply of an actual current value signal SI1 depending on the current I1 which is supplied on the output side by the inductive actuator 18 of the DC chopper.

Method Step V33:

Generation of a ramp disconnection signal AS being dependent on a received switch-off signal OFF.

Method Step V34:

Adding the actual current value signal SI1 to the ramp disconnection signal AS to form an elevated actual current value signal aSI1.

Method Step V35:

Controlling the controllable power switch 9 for control of a current discharge from the input capacitor 6 such that the power switch 9 will be switched off in each case if the elevated actual current value signal aSI1 is greater than a required current value signal SS1 predetermined for the DC chopper 71.

Although the present invention has been described in the foregoing with reference to the preferred exemplary embodiment, it is not restricted to this embodiment but can be modified in a plurality of ways. For example the present invention is not only applicable as in FIG. 1 to step-up converters, but also in general to step-down converters.

I claim:

1. A DC chopper for converting an input voltage into an output voltage, comprising:
    two input terminals for receiving the input voltage;
    an output capacitor providing the output voltage and the DC chopper supplying a current for charging said output capacitor;
    an input capacitor;
    an input filter device coupled between said input terminals and said input capacitor, said input filter device filtering the input voltage resulting in a filtered input voltage being supplied to said input capacitor;
    a setting device setting a required current value signal being dependent on the filtered input voltage, such that an oscillation of said input filter device and an oscillation of the current are phase-opposed;
    a controllable power switch coupled to said input capacitor; and
    a controller connected to and switching said controllable power switch for controlling a current discharge from said input capacitor in dependence on the required current value signal.

2. The DC chopper according to claim 1, wherein said controller switches off said controllable power switch in each case if an actual current value signal of the current is greater than the required current value signal.

3. A multiphase DC chopper for converting an input voltage into an output voltage, comprising:
    two input terminals for receiving the input voltage;
    an output capacitor providing the output voltage;
    an input capacitor;
    an input filter device coupled between said input terminals and said input capacitor, said input filter device filtering the input voltage resulting in a filtered input voltage being supplied to said input capacitor;
    a plurality of N DC choppers connected in parallel between said input capacitor and said output capacitor, an nth one of said DC choppers supplying an nth current for charging said output capacitor, with n∈[1, . . . , N], each of said DC choppers including:
        a setting device setting a required current value signal being dependent on the filtered input voltage, such that an oscillation of said input filter device and an oscillation of the nth current are phase-opposed;
        a controllable power switch coupled to said input capacitor; and
        a first controller connected to and switching said controllable power switch for controlling a current discharge from said input capacitor in dependence on the required current value signal.

4. The multiphase DC chopper according to claim 3, wherein said nth DC chopper has a peak current detection device supplying a peak current detection signal if an actual current value signal of said nth DC chopper is greater than the required current value signal predetermined for said nth DC chopper.

5. The multiphase DC chopper according to claim 3, wherein each of said DC choppers contains a regulation device having at least one RS flip-flop with an output side, said RS flip-flop, at least for said nth DC chopper supplying an nth phase difference signal from a phase difference between an nth peak current detection signal and an nth peak current detection signal on said output side.

6. The multiphase DC chopper according to claim 5, wherein said regulation device has at least a first RC element with an output node supplying a first nth required current value part signal being dependent on the nth phase difference signal.

7. The multiphase DC chopper according to claim 6, wherein:
   said input filter device has an output node; and
   said setting device has an output side and a series circuit formed of a setting resistor and a capacitor disposed between said output node of said input filter device and said output node of said first RC element, said setting device supplying a second nth required current value part signal in dependence on the filtered input voltage on said output side of said setting device.

8. The multiphase DC chopper according to claim 7, wherein said output node of said first RC element adds the first nth required current value part signal and the second nth required current value part signal to form the nth required current value signal.

9. The multiphase DC chopper according to claim 4, wherein said peak current detection device is integrated into said first controller.

10. A method for operating a DC chopper for converting an input voltage present between two input terminals into an a output voltage of an output capacitor, which comprises the steps of:
   coupling an input filter device between the input terminals and an input capacitor, the input filter device filtering the input voltage resulting in a filtered input voltage being supplied to the input capacitor;
   providing a DC chopper connected in parallel between the input capacitor and the output capacitor, the DC chopper supplying a current for charging the output capacitor;
   setting a required current value signal being dependent on the filtered input voltage such that an oscillation of the input filter device and an oscillation of the current are phase-opposed; and
   controlling a controllable power switch for controlling a current discharge from the input capacitor in dependence on the required current value signal.

11. A DC chopper for converting an input voltage of an input capacitor into an output voltage of an output capacitor, the DC chopper supplying a current for charging the output capacitor, the DC chopper comprising:
   an inductive actuator having an output side supplying the current;
   a first resistor, which, depending on the current supplied on said output side by said inductive actuator, supplies an actual current value signal;
   a second controller receiving the input voltage and depending on the input voltage supplying a control signal and adds the control signal to the actual current value signal supplied to form a controlled actual current value signal;
   a controllable power switch; and
   a first controller connected to and switching off said controllable power switch for controlling a current discharge from the input capacitor in each case if the controlled actual current value signal is greater than a required current value signal predetermined for the DC chopper.

12. The DC chopper according to claim 11, wherein said second controller includes:
   a second RC element having an output side and filtering the input voltage and supplying a filtered input voltage on said output side;
   a second resistor having a second output side and supplying the control signal on said second output side in dependence on the filtered input voltage; and
   an output node, which adds the actual current value signal to the control signal to form the controlled actual current value signal.

13. The DC chopper according to claim 12, further comprising a third RC element disposed between said first resistor and said output node of said second controller, said third RC element filtering the actual current value signal.

14. A method of operating a DC chopper configuration for converting an input voltage of an input capacitor into an output voltage of an output capacitor, which comprises the steps of:
   providing a DC chopper connected in parallel between the input capacitor and the output capacitor, the DC chopper supplying a current for charging the output capacitor;
   providing an actual current value signal being dependent on the current supplied on an output side of an inductive actuator of the DC chopper;
   providing a control signal being dependent on the input voltage;
   adding the control signal to the actual current value signal for forming a controlled actual current value signal; and
   controlling a controllable power switch for controlling a current discharge from the input capacitor such that the power switch is switched off in each case if the controlled actual current value signal is greater than a required current value signal predetermined for the DC chopper.

15. A DC chopper for converting an input voltage of an input capacitor into an output voltage of an output capacitor, and supplying a current for charging the output capacitor, the DC chopper comprising:
   an inductive actuator having an output side supplying the current for charging the output capacitor;
   a first resistor, which depending on the current supplied on said output side by said inductive actuator, supplies an actual current value signal;
   a disconnection device having an input side receiving a switch-off signal and, depending on the switch-off signal received, supplies a ramp disconnection signal;
   an add node for adding the actual current value signal to the ramp disconnection signal for forming an elevated actual current value signal;
   a controllable power switch; and
   a first controller connected to and switching off said controllable power switch for controlling a current discharge from the input capacitor in each case if the elevated actual current value signal is greater than a required current value signal predetermined for the DC chopper.

16. The DC chopper according to claim 15, wherein said disconnection device includes:
   a fourth RC element having an input side receiving the switch-off signal and, depending on the switch-off signal received, supplies a ramp switch-off signal; and
   an amplification device receiving and amplifying the ramp switch-off signal for forming the ramp disconnection signal.

17. The DC chopper according to claim 16, wherein said amplification device has a transistor connected as an emitter-follower, and a third resistor supplying the ramp disconnection signal as disconnection current.

18. A method of operating a DC chopper configuration for converting an input voltage of an input capacitor into an output voltage of an output capacitor, which comprises the steps of:

providing a DC chopper connected in parallel between the input capacitor and the output capacitor, the DC chopper supplying a current for charging the output capacitor;

supplying an actual current value signal being dependent on the current supplied on an output side of an inductive actuator of the DC chopper;

generating a ramp disconnection signal being dependent on a received switch-off signal;

adding the actual current value signal to the ramp disconnection signal for forming an elevated actual current value signal; and controlling a controllable power switch for controlling a current discharge from the input capacitor such that the power switch will be switched off in each case if the elevated actual current value signal is greater than a required current value signal predetermined for the DC chopper.

* * * * *